(12) United States Patent
Rezvoi (10) Patent No.: US 11,295,869 B2
(45) Date of Patent: Apr. 5, 2022

(54) METHODS OF PRESERVING A NUCLEAR FUEL ELEMENT

(71) Applicant: Battelle Energy Alliance, LLC, Idaho Falls, ID (US)

(72) Inventor: Aleksey Rezvoi, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 117 days.

(21) Appl. No.: 16/564,552

(22) Filed: Sep. 9, 2019

(65) Prior Publication Data
US 2020/0082951 A1    Mar. 12, 2020

Related U.S. Application Data

(60) Provisional application No. 62/730,139, filed on Sep. 12, 2018.

(51) Int. Cl.
| | |
|---|---|
| *G21C 3/20* | (2006.01) |
| *C23C 22/07* | (2006.01) |
| *G21C 13/087* | (2006.01) |
| *C08K 3/32* | (2006.01) |
| *G21C 19/32* | (2006.01) |
| *G21C 21/02* | (2006.01) |
| *C23C 22/00* | (2006.01) |
| *G21F 5/008* | (2006.01) |
| *C25D 11/08* | (2006.01) |

(52) U.S. Cl.
CPC ............... *G21C 3/20* (2013.01); *C23C 22/07* (2013.01); *C08K 2003/327* (2013.01); *C23C 22/00* (2013.01); *C25D 11/08* (2013.01); *G21C 13/087* (2013.01); *G21C 19/32* (2013.01); *G21C 21/02* (2013.01); *G21F 5/008* (2013.01)

(58) Field of Classification Search
CPC .......... G21C 3/20; G21C 19/32; G21C 21/02; C23C 22/07; C23C 22/00; C23C 22/08; C08K 2003/327; C25D 11/08; G21F 5/008

See application file for complete search history.

(56) References Cited

U.S. PATENT DOCUMENTS 5,059,258 A    10/1991    Wefers et al.

OTHER PUBLICATIONS

Gibbs, "Corrosion of aluminum cladding under optimized water conditions", No. RRD-RTS-920119, DE93 004958, Westinghouse Savannah River Co., Aiken, SC (United States), 1992. (Year: 1992).*

Zhao, "Recent development in phosphonic acid-based organic coatings on aluminum", Coatings 7, No. 9 (2017): 133. (Year: 2017).*

(Continued)

*Primary Examiner* — Jack W Keith
*Assistant Examiner* — Daniel Wasil
(74) *Attorney, Agent, or Firm* — TraskBritt (57) ABSTRACT

A method of preserving a nuclear fuel includes exposing a surface of a fuel element comprising aluminum to a phosphorus-containing acid and reacting the phosphorus-containing acid with the aluminum to form aluminum phosphate ($AlPO_4$). A nuclear fuel element includes a nuclear fuel and a shell surrounding the nuclear fuel. The shell comprises aluminum phosphate.

17 Claims, 5 Drawing Sheets

(56) References Cited

OTHER PUBLICATIONS

Grant, "Summary of Corrosion Investigations of High-Temperature Aluminum Alloys", Oct. 1957-Dec. 1959, No. ANL-6204. Argonne National Lab, 1961. (Year: 1961).*
Keith, "Shear damage mechanisms in a woven, nicalon-reinforced ceramic-matrix composite", Journal of the American Ceramic Society 80, No. 2 (1997): 357-364. (Year: 1997).*
Kaminski, "Aqueous corrosion of aluminum-based nuclear fuel", Journal of Nuclear Materials 304, No. 2-3 (2002): 182-188. (Year: 2002).*
Mariani et al., "Novel Accident-Tolerant Fuel Meat and Cladding", Top Fules 2013, INL/CON-13-28303 (Sep. 2013) 9 pages.

* cited by examiner

METHODS OF PRESERVING A NUCLEAR FUEL ELEMENT

CROSS-REFERENCE TO RELATED APPLICATION

This application claims the benefit under 35 U.S.C. § 119(e) of U.S. Provisional Patent Application Ser. No. 62/730,139, filed Sep. 12, 2018, the disclosure of which is hereby incorporated herein in its entirety by this reference.

STATEMENT REGARDING FEDERALLY SPONSORED RESEARCH OR DEVELOPMENT

This invention was made with government support under Contract Numbers DE-AC07-05-ID14517, awarded by the United States Department of Energy. The government has certain rights in the invention.

TECHNICAL FIELD

Embodiments of the present disclosure relate generally to materials and processes for preservation and storage of nuclear fuel.

BACKGROUND

Nuclear power is recognized as a means to eliminate carbon dioxide emissions in the production of large quantities of energy, but radioactive waste disposal remains an issue. The secure and timely disposal of, along with the controllable storage of transuranic materials (primarily plutonium) has been the subject of intense debate in recent years. Spent fuel from existing nuclear power reactors is a primary source of radioactive waste.

Large quantities of transuranics are contained in the spent nuclear fuel inventories of existing nuclear reactors. This material does not pose an immediate proliferation concern because it already exists in a dilute (transuranics constitute about 1% of the total heavy metal mass) and highly radioactive form. There are long-term challenges to storing spent nuclear fuel because the materials can contaminate the environment, such as water sources (e.g., groundwater), and the contamination can spread over long distances.

Figure 1:
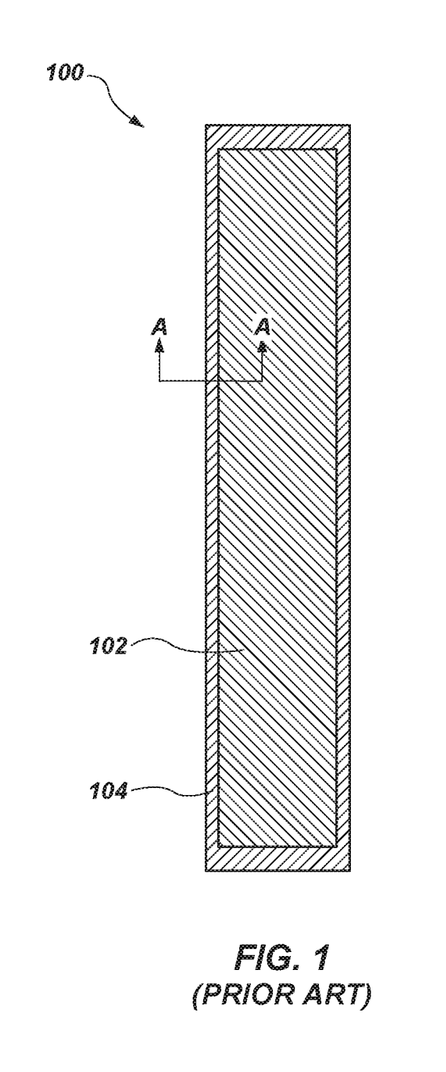
FIG. 1 is a simplified cross-sectional view illustrating a fuel element.

Nuclear fuel that can no longer be used in a reactor core in its current form is referred to as "spent" nuclear fuel (or spent fuel). Spent nuclear fuel may be encased in an aluminum cladding material and stored in either wet or dry conditions after usage. Continued chemical damage (e.g., corrosion) to the aluminum cladding material can cause reactions that produce hydrogen. FIG. 1 is a simplified cross-sectional illustration of a fuel element 100. The fuel element 100 contains a nuclear fuel 102 and a cladding material 104 thereon. The nuclear fuel 102 may include one or more radioactive elements (e.g., radioactive isotopes), such as uranium, transuranic elements, and various radioactive decay products. The nuclear fuel 102 may be referred to in the art and herein as "fuel meat." The radioactive elements in the nuclear fuel 102 may be in the form of chemical compounds, alloys, or other mixtures. For example, the nuclear fuel 102 may include alloys such as $U_xAl_y$, $U_xMo_y$, or $P_xAl_y$, or oxides such as $UO_2$ or $PO_2$. The nuclear fuel 102 may be spent nuclear fuel, or may be a "used" nuclear fuel that is still useful in a nuclear reactor.

The cladding material 104 is typically designed to encapsulate the nuclear fuel 102 and protect the nuclear fuel 102 from reacting with the ambient environment. The cladding material 104 may include an aluminum coating, a zirconium coating, a stainless steel coating, etc. As known in the art, aluminum typically includes a thin layer of aluminum oxide ($Al_2O_3$) at the surface, formed by oxidation of exposed aluminum. The cladding material 104 may also include other oxides (e.g., other aluminum oxides), such as an aluminum oxide hydroxide phase ($\gamma$-AlO(OH)). Such oxides may chemically react with water to generate hydrogen, which can be explosive.

BRIEF SUMMARY

A method of preserving a nuclear fuel includes exposing a surface of a fuel element comprising aluminum to a phosphorus-containing acid and reacting the phosphorus-containing acid with the aluminum to form aluminum phosphate ($AlPO_4$).

A nuclear fuel element includes a nuclear fuel and a shell surrounding the nuclear fuel. The shell comprises aluminum phosphate ($AlPO_4$).

In accordance with other embodiments of the disclosure, a method of preserving a fuel element comprises contacting a surface of a fuel element including a cladding material comprising aluminum with a phosphorus-containing acid; and reacting the phosphorus-containing acid with the aluminum to form aluminum phosphate directly on elemental aluminum.

DETAILED DESCRIPTION

The illustrations presented herein are not actual views of any particular material, component, or system, but are merely idealized representations that are employed to describe example embodiments of the present disclosure. Additionally, elements common between figures may retain the same numerical designation.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow, apparatus, system, or method for stabilizing nuclear fuel. Only those process acts and structures necessary to understand the embodiments of the disclosure are described in detail below. Additional acts may be performed by conventional techniques. Also note, the drawings accompanying the present application are for illustrative purposes only, and are thus not drawn to scale.

Figure 2:
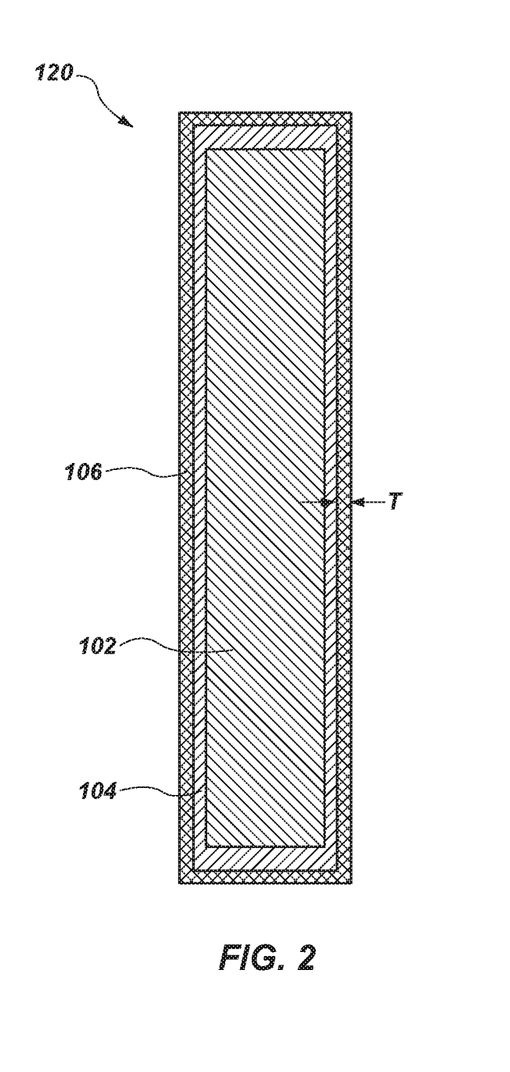
FIG. 2 is a simplified cross-sectional view illustrating a fuel element having a shell as disclosed herein.

Methods described herein may be used to preserve or protect nuclear fuel, such as during long-term storage. FIG. 2 is a simplified cross-sectional illustration of a fuel element 120 that includes a shell 106 surrounding a cladding material 104 for nuclear fuel 102. The nuclear fuel 102 may include a spent nuclear fuel. In some embodiments, the nuclear fuel 102 comprises a low-enriched material (e.g., low-enriched uranium dioxide). The nuclear fuel 102 may comprise uranium dioxide ($UO_2$), a uranium oxide (e.g., $U_3O_8$), plutonium oxide (e.g., $PO_2$), uranium silicide ($U_3Si_2$), uranium carbide (UC), uranium-molybdenum fuels (U—Mo, $U_xMo_y$) and alloys thereof, uranium-beryllium ($UBe_x$) and oxides thereof (e.g., $BeO$—$UO_2$), uranium-aluminum fuels (e.g., $U_xAl_y$), plutonium-aluminum fuels (e.g., $P_xAl_y$), plutonium oxide, other fissile fuels, and combinations thereof.

The cladding material 104 may include one or more of aluminum, zirconium, and a stainless steel material. In some embodiments, the cladding material 104 includes aluminum and one or more other materials, such as one or more of copper, manganese, silicon, magnesium, zinc, and lithium. In some embodiments, the cladding material 104 comprises elemental aluminum. A portion (e.g., an outer portion) of the aluminum may comprise aluminum oxide.

Though the cladding material 104 is designed to encapsulate the nuclear fuel 102 and protect the nuclear fuel 102 from reaction with the ambient environment, defects and damage to the cladding material 104 can occur during transport, storage, and use of the fuel element 120. Furthermore, the cladding material 104 may oxidize (such as by oxidation of aluminum to aluminum oxide), decreasing its heat transfer properties. The shell 106 may alleviate some of these problems. In other embodiments, the cladding material 104 may be omitted entirely and the shell 106 may directly contact the nuclear fuel 102. In some such embodiments, the shell 106 may form a protective coating directly on the nuclear fuel 102.

The shell 106 may have a thickness T less than about 1.0 micron (μm). In some such embodiment, the thickness T may be a submicron thickness. By way of nonlimiting example, the thickness T of the shell 106 may be within a range from about 10 nm to about 1.0 such as from about 10 nm to about 50 nm, from about 50 nm to about 100 nm, from about 100 nm to about 200 nm, from about 200 nm to about 400 nm, from about 400 nm to about 600 nm, from about 600 nm to about 800 nm, or from about 800 nm to about 1.0 μm. However, the disclosure is not so limited and the thickness T may be different than those described.

Figure 3:
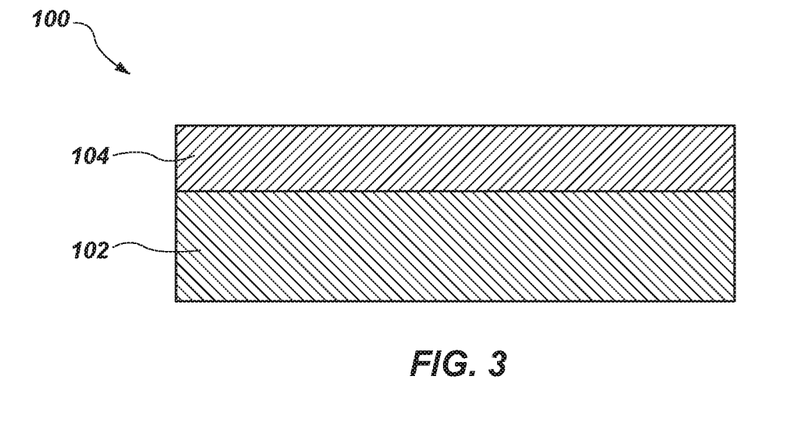
FIGS. 3 through 14 are simplified cross-sectional views illustrating portions of fuel elements at various points in processing as disclosed herein.
Figure 4:
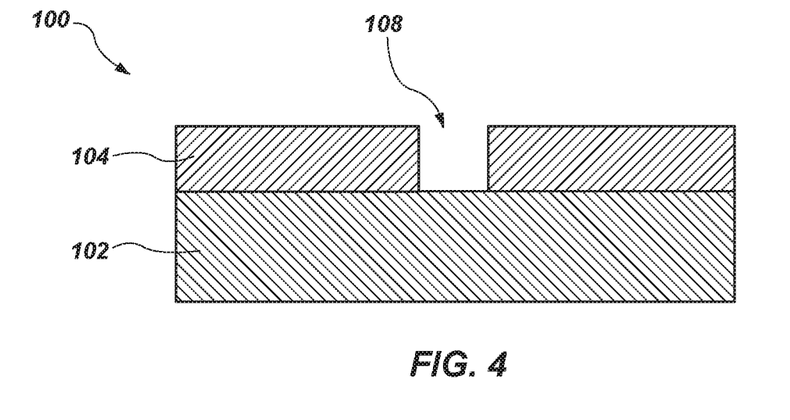

FIG. 3 is a simplified cross-sectional view of a portion of a fuel element (e.g., fuel element 100), such as through section line A-A of FIG. 1. As illustrated, the cladding material 104 may generally cover the nuclear fuel 102. FIG. 4 is a simplified cross-sectional view of another portion of the fuel element 100. The cladding material 104 has a break 108 through which the underlying nuclear fuel 102 is exposed. The break 108 may be due to a manufacturing defect, thermal expansion, oxidation and damage through the exposure to environmental conditions, corrosion, erosion, or any other cause.

Figure 5:
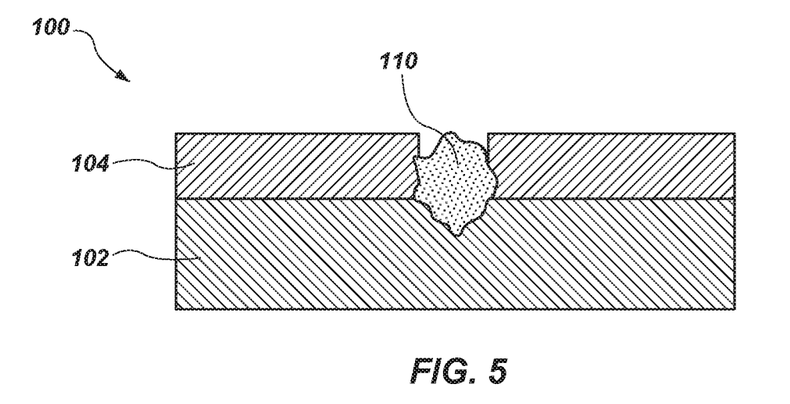
Figure 6:
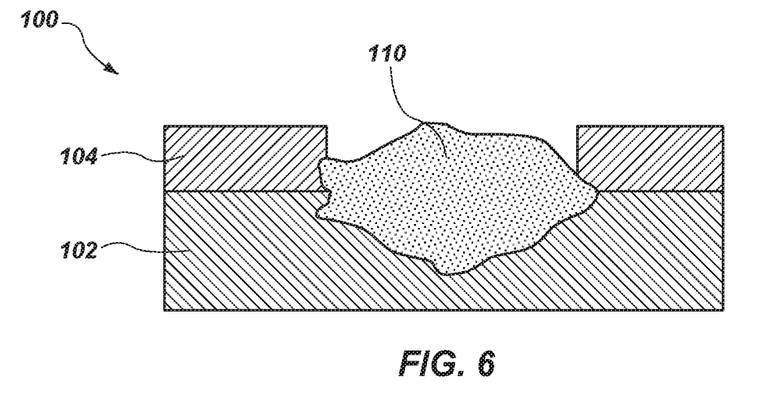
Figure 7:
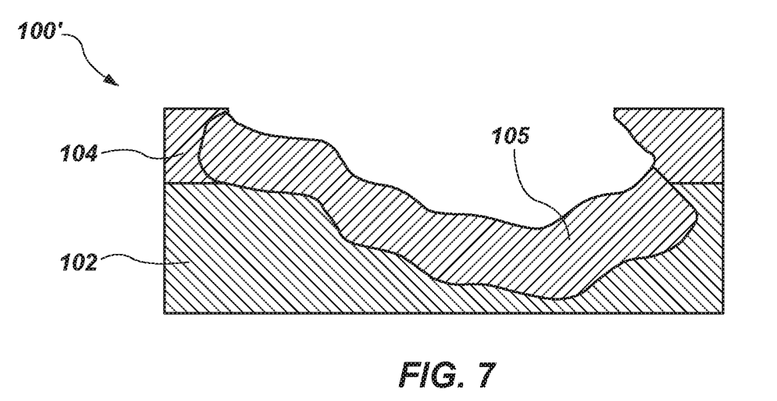

As shown in FIG. 5, the cladding material 104 and/or the nuclear fuel 102 may react to form corrosion 110 within or adjacent the break 108. The corrosion 110 may grow and consume additional amounts of the cladding material 104 and/or nuclear fuel 102, as illustrated in FIG. 6. The corrosion 110 may be removed, as shown in FIG. 7, and additional cladding material 105 may be added to fill the break 108 and form a repaired fuel element 100'. The additional cladding material 105 may comprise the same material composition as the cladding material 104, such as aluminum. In some embodiments, the additional cladding material 105 may be substantially conformal over surfaces of the nuclear fuel 102. In some such embodiments, the additional cladding material 105 may have a different thickness than the original cladding material 104.

Figure 8:
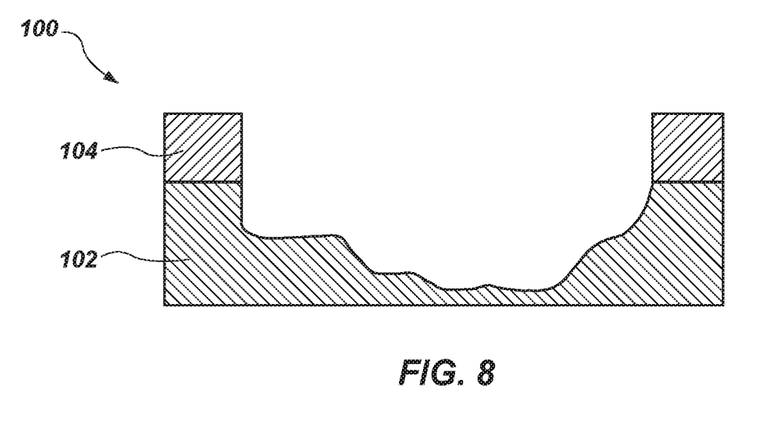

If additional cladding material 104 is not added to fill the break 108, the corrosion 110 may spread and begin exfoliating the cladding material 104 from the nuclear fuel 102. Erosion may cause further damage to the fuel element 100, as shown in FIG. 8. Furthermore, erosion of the cladding material 104 and/or the nuclear fuel 102 may cause the release of hydrogen, which is a safety concern for storage of the nuclear fuel 102.

Figure 9:
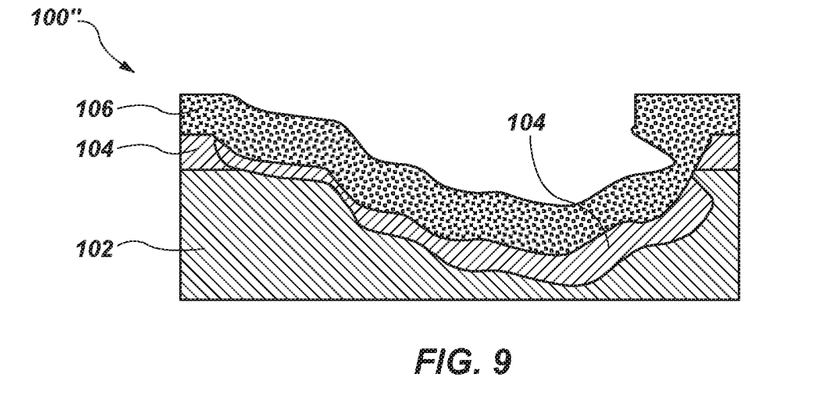

Further damage may be limited or avoided by applying a shell 106, which may comprise a protective material, around the nuclear fuel 102, and, if present, around the cladding material 104, to form a repaired fuel element 100", as shown in FIG. 9. The shell 106 may include a layer of aluminum phosphate ($AlPO_4$), which is mechanically strong and chemically inert to water or other chemically active solvents. The shell 106 may protect the nuclear fuel 102 and the cladding material 104 from further damage, such that the fuel element 100 may be stored safely. The shell 106 may have the same thickness T as described above with reference to the shell 106 of FIG. 2. In some embodiments, the shell 106 is formed substantially conformally over portions of the cladding material 104 and/or the nuclear fuel 102 that have been damaged.

Figure 10:
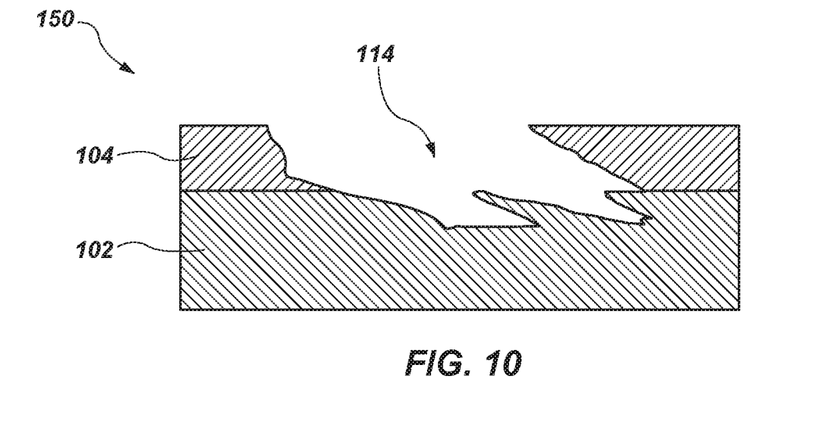
Figure 11:
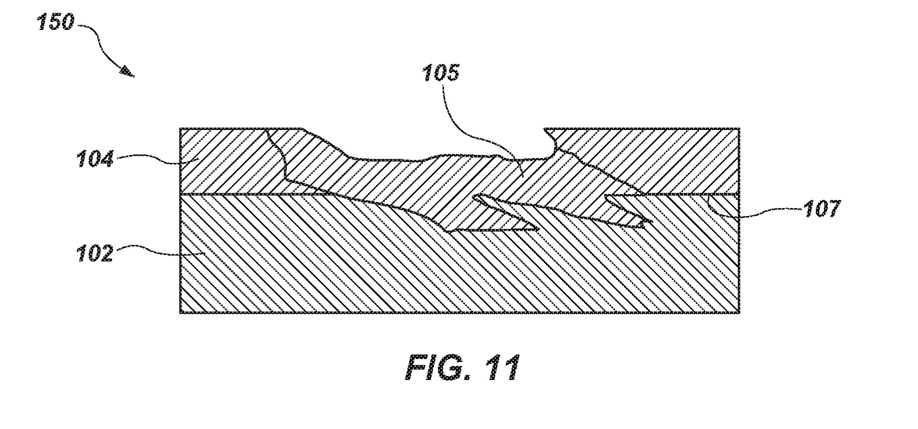

FIG. 10 is a simplified cross-sectional view of a portion of a fuel element 150, and illustrates a site 114 of mechanical or corrosive damage (e.g., cavities, scratches, etc.) to the cladding material 104 and the nuclear fuel 102. The damage may expose at least a portion of the nuclear fuel 102 to the environment. FIG. 11 illustrates that the damage may be repaired by applying additional cladding material 105 to the site 114. The additional cladding material 105 may extend into the nuclear fuel 102 beyond a major surface 107 of the nuclear fuel 102.

Figure 12:
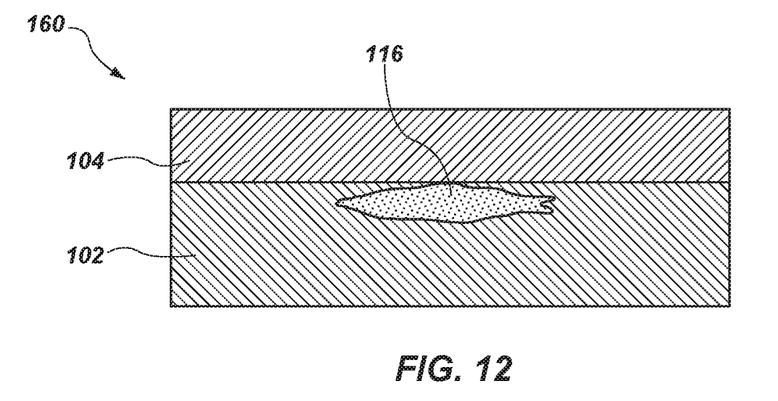
Figure 13:
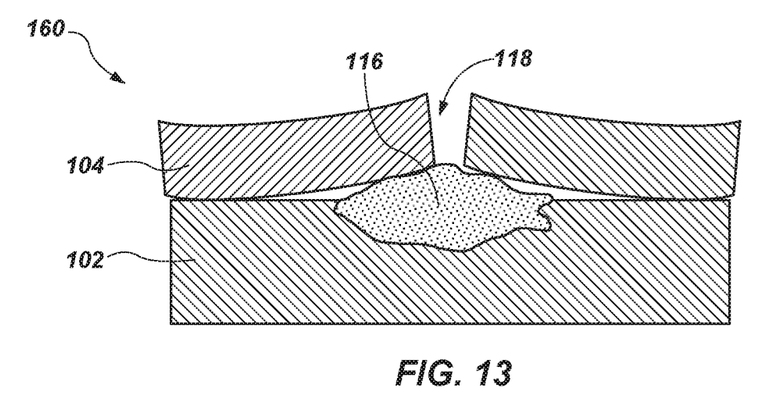
Figure 14:
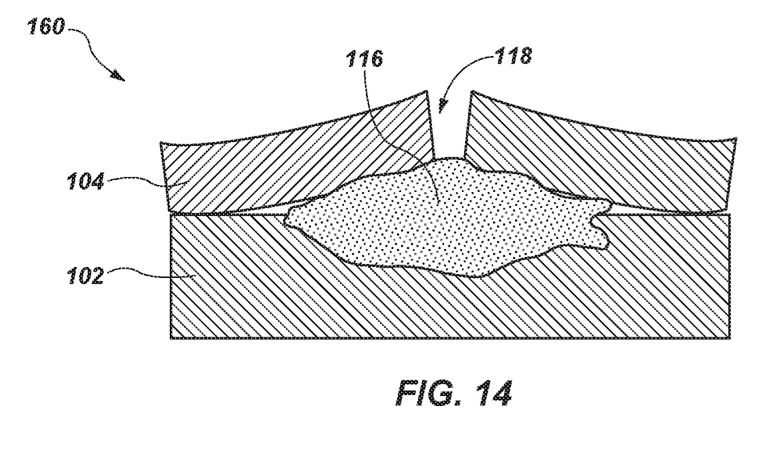

FIG. 12 is a simplified cross-sectional view of a portion of a fuel element 160, and illustrates impurities 116 within the nuclear fuel 102. The impurities 116 may react within the fuel element 160, such as within the nuclear fuel 102, and may grow in size, as shown in FIGS. 13 and 14. The impurities 116 may cause a break 118 in the cladding material 104, and in some cases, separation of the cladding material 104 from the nuclear fuel 102. Thus, the impurities 116, the cladding material 104, and the nuclear fuel 102 may be exposed to corrosion and erosion. If the impurities 116 grow in size a sufficient amount and break the cladding material 104, the nuclear fuel 102 may be exposed.

The imperfections, damage, and impurities may be corrected using the shell 106 depicted in FIG. 9. In some embodiments, the shell 106 may be formed without first removing corrosion or impurities. In other words, the shell 106 may be formed directly on and in contact with the corrosion or impurities. In other embodiments, formation of the shell 106 may simultaneously remove corrosion or impurities. In certain embodiments, corrosion or impurities may be removed prior to formation of the shell 106.

The shell 106 may be formed by exposing a surface of the cladding material 104 to one or more phosphorus-containing acids. Phosphorus from the acid may react with and bond to the aluminum of the cladding material 104. For example, the phosphorus-containing acid may be one or more of phosphoric acid ($H_3PO_4$), hypophosphoric acid ($H_4P_2O_6$), phosphorous acid (i.e., phosphonic acid, $H_3PO_3$), and hypophosphorous acid (i.e., phosphinic acid, $H_3PO_2$). In some embodiments, the acid comprises phosphoric acid. In some embodiments, other materials may be present in the phosphorus-containing acid. In some embodiments, an electrical potential is applied to the fuel element 100 concurrently with the exposure to the acid to increase the reaction rate (e.g., by anodizing the fuel element). By way of nonlimiting example, an electric potential within a range of from about 0.5 V to about 10.0 V, such as from about 0.5 V to about 1.0 V, from about 1.0 V to about 2.0 V, from about 2.0 V to about 4.0 V, from about 4.0 V to about 6.0 V, from about 6.0 V to about 8.0 V, or from about 8.0 V to about 10.0 V may be applied to the fuel element 100 concurrently with exposure to the acid.

The exposure may be performed under atmospheric conditions, a vacuum, or an inert atmosphere. The exposure may be performed within a wide temperature range, such as from about 20° C. to about 80° C. (e.g., from about 20° C. to about 30° C., from about 30° C. to about 40° C., from about 40° C. to about 50° C., from about 50° C. to about 60° C., from about 60° C. to about 70° C., or from about 70° C. to about 80° C.), and within a wide range of exposure times, such as from about 1 second to about 60 minutes. The exposure may be performed under conditions described in U.S. Pat. No. 5,059,258, "Phosphonic/Phosphinic Acid Bonded to Aluminum Hydroxide Layer," issued Oct. 22, 1991, the entire disclosure of which is hereby incorporated herein by reference.

In some embodiments, the fuel element 100 may be exposed to the phosphorus-containing acid by immersing the fuel element 100 in the phosphorus-containing acid. In other embodiments, the acid is sprayed on the fuel element 100.

The acid may comprise a weight percent of the phosphorus-containing acid within a range of from about 10 weight percent to about 50 weight percent, such as from about 10 weight percent to about 20 weight percent, from about 20 weight percent to about 30 weight percent, from about 30 weight percent to about 40 weight percent, or from about 40 weight percent to about 50 weight percent. In some embodiments, the acid comprises about 25 weight percent of the phosphorus-containing acid.

Reaction of the acid with aluminum (e.g., as a component of the cladding material 104 or the nuclear fuel 102) may remove aluminum oxides and form aluminum phosphate ($AlPO_4$) on the surface of the nuclear fuel and/or the cladding material 104. Formation of the shell 106 may seal any holes (e.g., the break 108 (FIG. 4), the site 114 of damage (FIG. 10), or the break 118 (FIG. 14)) in the cladding material 104. The thickness of the aluminum phosphate may be the same as the thickness T described above with reference to the shell 106.

In some embodiments, the aluminum phosphate directly contacts the cladding material 104. In some such embodiments, the aluminum phosphate directly contacts elemental aluminum (and not aluminum oxide). The aluminum phosphate may also directly contact the nuclear fuel 102. In some embodiments, a portion of the aluminum phosphate directly contacts the cladding material 104 and another portion of the aluminum phosphate directly contacts the nuclear fuel 102.

The aluminum phosphate may be impermeable to oxygen, limiting or preventing subsequent oxidation of the nuclear fuel 102 or the cladding material 104 contained in the shell 106. The process as disclosed may enable stable long-term storage of the fuel element 120. Typically, it is preferred to avoid storing radioactive oxides, either with water (i.e., wet cask) or without water (i.e., dry cask), because the oxides tend to continue to react, and may form hydrogen. Hydrogen production in storage creates an explosion risk. Thus, by sealing the nuclear fuel 102 and the cladding material 104 in the shell 106, such risks may be decreased.

Additional non limiting example embodiments of the disclosure are described below.

Embodiment 1

A method of preserving a nuclear fuel, the method comprising exposing a surface of a fuel element comprising aluminum to a phosphorus-containing acid and reacting the phosphorus-containing acid with the aluminum to form aluminum phosphate ($AlPO_4$).

Embodiment 2

The method of Embodiment 1, wherein exposing a surface of a fuel element to a phosphorus-containing acid comprises exposing the surface of the fuel element to phosphoric acid (i.e., $H_3PO_4$).

Embodiment 3

The method of Embodiment 1 or Embodiment 2, wherein exposing a surface of a fuel element to a phosphorus-containing acid comprises exposing the surface of the fuel element to hypophosphoric acid (i.e., $H_4P_2O_6$).

Embodiment 4

The method of any one of Embodiments 1 through 3, wherein exposing a surface of a fuel element to a phosphorus-containing acid comprises exposing the surface of the fuel element to phosphorous acid (i.e., phosphonic acid, $H_3PO_3$).

Embodiment 5

The method of any one of Embodiments 1 through 4, wherein exposing a surface of a fuel element to a phosphorus-containing acid comprises exposing the surface of the fuel element to hypophosphorous acid (i.e., phosphinic acid, $H_3PO_2$).

Embodiment 6

The method of any one of Embodiments 1 through 5, wherein exposing a surface of a fuel element to a phosphorus-containing acid comprises applying an electrical potential to the surface of the fuel element while exposing the surface of the fuel element to the phosphorus-containing acid.

Embodiment 7

The method of any one of Embodiments 1 through 6, wherein exposing a surface of a fuel element to a phosphorus-containing acid comprises removing corrosion from the fuel element.

Embodiment 8

The method of any one of Embodiments 1 through 7, wherein exposing a surface of a fuel element comprising aluminum to a phosphorus-containing acid comprises exposing a surface of a cladding material to the phosphorus-containing acid.

Embodiment 9

The method of Embodiment 8, wherein reacting the phosphorus-containing acid with the aluminum comprises sealing at least one hole through the cladding material.

Embodiment 10

The method of any one of Embodiments 1 through 9, wherein reacting the phosphorus-containing acid with the aluminum comprises forming a barrier impermeable to oxygen.

Embodiment 11

The method of any one of Embodiments 1 through 10, wherein reacting the phosphorus-containing acid with the aluminum comprises forming aluminum phosphate over an exposed surface of the fuel element.

Embodiment 12

The method of any one of Embodiments 1 through 11, wherein reacting the phosphorus-containing acid with the aluminum to form aluminum phosphate comprises forming the aluminum phosphate directly contacting elemental aluminum.

Embodiment 13

A nuclear fuel element comprising a nuclear fuel and a shell surrounding the nuclear fuel. The shell comprises aluminum phosphate ($AlPO_4$).

Embodiment 14

The nuclear fuel element of Embodiment 13, further comprising a cladding material at least partially surrounding the nuclear fuel.

Embodiment 15

The nuclear fuel element of Embodiment 14, wherein the cladding material comprises at least one material selected from the group consisting of aluminum, zirconium, and stainless steel.

Embodiment 16

The nuclear fuel element of Embodiment 15, wherein the cladding material comprises aluminum oxide.

Embodiment 17

The nuclear fuel element of any one of Embodiments 14 through 16, wherein the cladding material defines at least one orifice, and wherein the shell is in contact with the nuclear fuel through the at least one orifice.

Embodiment 18

The nuclear fuel element of any one of Embodiments 14 through 17, wherein the nuclear fuel comprises $U_xAl_y$, wherein x and y are integers.

Embodiment 19

The nuclear fuel element of any one of Embodiments 14 through 18, wherein the nuclear fuel comprises $UO_2$.

Embodiment 20

The nuclear fuel element of any one of Embodiments 14 through 19, wherein the nuclear fuel comprises spent nuclear fuel.

Embodiment 21

A method of preserving a fuel element, the method comprising: contacting a surface of a fuel element including a cladding material comprising aluminum with a phosphorus-containing acid; and reacting the phosphorus-containing acid with the aluminum to form aluminum phosphate directly on elemental aluminum.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated. Further, embodiments of the disclosure have utility with different and various processes.

What is claimed is:

1. A method of preserving a nuclear fuel element, the method comprising:
   removing corrosion from a surface of a corroded nuclear fuel element; and
   after removing the corrosion from the nuclear fuel element, exposing the surface of the nuclear fuel element to a phosphorus-containing acid, the nuclear fuel element comprising a nuclear fuel and a cladding material on the nuclear fuel, one of the nuclear fuel and the cladding material comprising aluminum, exposing the surface of the nuclear fuel element
   comprising reacting the phosphorus-containing acid with the aluminum to form aluminum phosphate ($AlPO_4$) on a surface of one or both of the nuclear fuel and the cladding material.

2. The method of claim 1, wherein exposing the surface of the nuclear fuel element to a phosphorus-containing acid comprises exposing the surface of the nuclear fuel element to phosphoric acid.

3. The method of claim 1, wherein exposing the surface of the nuclear fuel element to a phosphorus-containing acid comprises exposing the surface of the nuclear fuel element to hypophosphoric acid.

4. The method of claim 1, wherein exposing the surface of the nuclear fuel element to a phosphorus-containing acid comprises exposing the surface of the nuclear fuel element to phosphorous acid.

5. The method of claim 1, wherein exposing the surface of the nuclear fuel element to a phosphorus-containing acid comprises exposing the surface of the nuclear fuel element to hypophosphorous acid.

6. The method of claim 1, wherein exposing the surface of the nuclear fuel element to a phosphorus-containing acid comprises applying an electrical potential to the surface of the nuclear fuel element while exposing the surface of the nuclear fuel element to the phosphorus-containing acid.

7. The method of claim 1, wherein exposing the surface of the nuclear fuel element comprising aluminum to a phosphorus-containing acid comprises exposing a surface of a cladding material to the phosphorus-containing acid.

8. The method of claim 7, wherein reacting the phosphorus-containing acid with the aluminum comprises sealing at least one hole through the cladding material.

9. The method of claim 1, wherein reacting the phosphorus-containing acid with the aluminum comprises forming a barrier impermeable to oxygen.

10. The method of claim 1, wherein reacting the phosphorus-containing acid with the aluminum comprises forming the aluminum phosphate directly contacting each of the cladding material and the nuclear fuel.

11. The method of claim 1, wherein reacting the phosphorus-containing acid with the aluminum to form aluminum phosphate comprises forming the aluminum phosphate directly contacting elemental aluminum.

12. The method of claim 1, wherein exposing the surface of the nuclear fuel element comprising aluminum to a phosphorus-containing acid comprises exposing a surface of a cladding material comprising least one material selected from the group consisting of aluminum, zirconium, and stainless steel to the phosphorus-containing acid.

13. The method of claim 1, wherein exposing the surface of the nuclear fuel element comprising aluminum to a phosphorus-containing acid comprises exposing a surface of a cladding material comprising aluminum to the phosphorus-containing acid.

14. The method of claim 1, wherein exposing the surface of the nuclear fuel element comprising aluminum to a phosphorus-containing acid comprises exposing a surface of a cladding material comprising aluminum oxide to the phosphorus-containing acid.

15. The method of claim 1, wherein reacting the phosphorus-containing acid with the aluminum to form aluminum phosphate ($AlPO_4$) comprises reacting the phosphorus-containing acid with the aluminum through at least one orifice in a cladding material and forming the aluminum phosphate ($AlPO_4$) in contact with the fuel element.

16. The method of claim 1, wherein exposing the surface of the nuclear fuel element to a phosphorus-containing acid comprises exposing, to the phosphorus-containing acid, a surface of a nuclear fuel comprising $U_xAl_y$, wherein x and y are integers.

17. The method of claim 1, wherein exposing the surface of the nuclear fuel element to a phosphorus-containing acid comprises exposing a surface of a nuclear fuel element comprising spent nuclear fuel to the phosphorus-containing acid.

* * * * *

UNITED STATES PATENT AND TRADEMARK OFFICE
CERTIFICATE OF CORRECTION

PATENT NO. : 11,295,869 B2
APPLICATION NO. : 16/564552
DATED : April 5, 2022
INVENTOR(S) : Aleksey Rezvoi

Page 1 of 1

It is certified that error appears in the above-identified patent and that said Letters Patent is hereby corrected as shown below:

In the Specification

Column 3, Line 38, change "1.0 such" to --1.0 µm, such--

Signed and Sealed this
Twenty-fourth Day of January, 2023

Katherine Kelly Vidal
*Director of the United States Patent and Trademark Office*